United States Patent Office 3,531,997
Patented Oct. 6, 1970

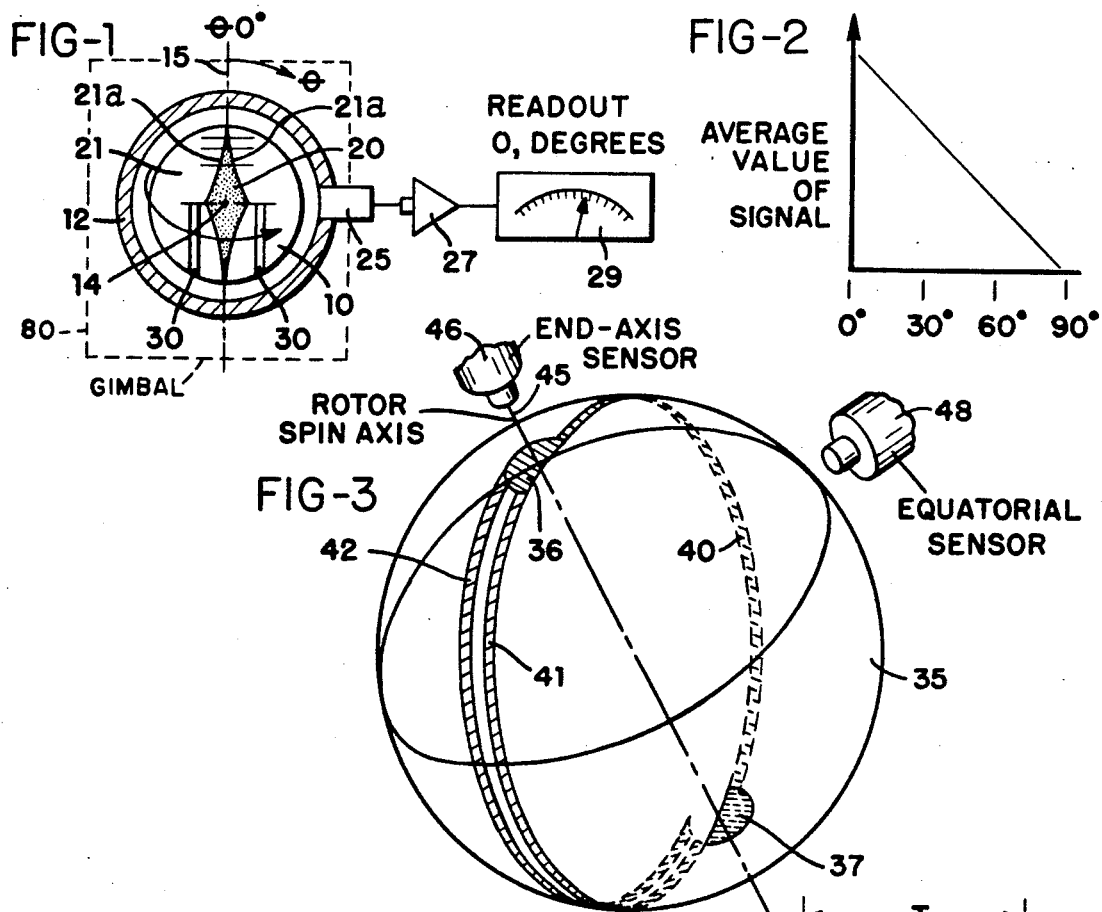
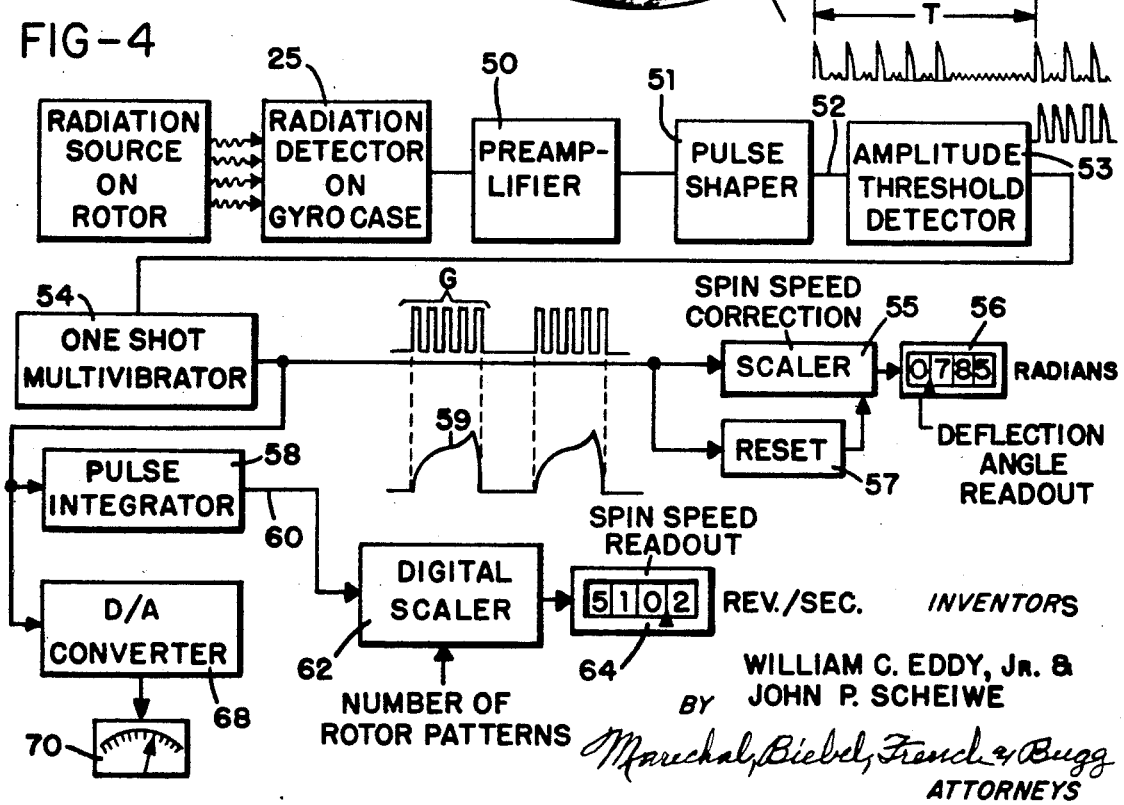

3,531,997
PASSIVE DEVICE FOR DETERMINING RELATIVE ROTATION
William C. Eddy, Jr., Columbus, and John P. Schelwe, Worthington, Ohio, assignors to Industrial Nucleonics Corporation, a corporation of Ohio
Filed June 30, 1967, Ser. No. 650,387
Int. Cl. G01c 19/28
U.S. Cl. 74—5.6                                        14 Claims

ABSTRACT OF THE DISCLOSURE

An inertial instrument includes a passive source on the inertial element formed as a pattern of interstitially retained inert gas radioisotope which does not appreciably alter the mass of the inertial element. The inert gas radioisotope is krypton-85, the atoms of which are retained in the lattice of the material of the inertial element. Detectors are positioned to sense the radioactive and non-radioactive areas of the pattern to produce an output signal which is digital and representative of the relative displacement of the inertial element.

FIELD OF INVENTION

This invention relates to an apparatus for determining with accuracy the relative displacement, in one or more degrees of freedom, between a support member and the rotating inertial member of an inertial instrument.

BACKGROUND OF THE INVENTION

It is known from the prior art to use contrasting patterns on the inertial element of an inertial instrument for the purpose of providing information as to the relative displacement of the inertial mass. Such a system is described in U.S. Pat. No. 3,239,673. In the latter patent, an active source (light source and lens) is used to illuminate the pattern and a photocell is positioned to receive light deflected from the pattern. The objection to this arrangement is that the output fom the photocell is analog, whereas a digital output is far more accurate. Thus, an analog to digital converter is used which receives the analog output of the photocell. Further, since the source is "active" any variation in the power supply of the light source, or any variation in the light emitted by the source creates an error which adversely affects the accuracy of the system.

The above-identified patent also mentions that the pattern on the inertial member could be comprised of radioactive and non-radiocative surfaces, but no specific disclosure is set forth as to how this is to be accomplished.

One obvious method of applying a pattern is to use a radioactive pigment in a paint and to paint the radioactive pattern on selected surface portions of the inertial member. The objection to this procedure is that the high speeds at which the inertial element rotates creates substantial centifugal forces which tend to loosen any radioactive paint which is not firmly adhered. Additionally, the use of a non-symmetrical pattern is precluded because of the uneven weight distribution of the inertial mass which creates problems in establishing or maintaining balance of the inertial member.

Another procedure which might be used would be to incorporate particles of radioactive material into the inertial member in a pattern, but the presence of foreign particles within the material constituting the inertial member gives rise to weaknesses in the metal which may be sufficiently serious to present problems at the high speeds at which the inertial members are rotated.

SUMMARY OF THE INVENTION

In accordance with the present invention the above objections are overcome by the provision of an inertial instrument including an inertial member which is mounted for rotation about a spin axis, and where the inertial element includes a pattern in predetermined configuration comprised of radioactive and non-radioactive areas. The radioactive areas are constituted by atoms of an inert radioactive gas, krypton-85, interstitially retained in the lattice of the inertial member. Radiation detector means are mounted for sensing the pattern and providing a digital output signal indicative of the relative position of the inertial member.

The use of an inert gas isotope interstitially retained within the lattice of the material constituting the inertial member does not adversely affect the balance of the inertial member, and the atoms are sufficiently retained or trapped in the surface of the inertial member so as to withstand the high centifugal forces created as the inertial member is rotated at a relatively high speed. Also, the interstitially retained inert gas radioisotope does not adversely affect the strength of the material constituting the inertial member.

The present invention offers the advantage of providing a passive source and thus eliminating source intensity variation problems characteristic of an active source. Further, since the pattern in accordance with the present invention is relatively easily formed, as described in application Ser. No. 650,226, filed of even date herewith and assigned to the assignee of this application, it is possible to pre-balance the inertial member and thereafter form the pattern without substantially affecting the balance.

Accordingly, it is a primary object of the present invention to provide an inertial instrument wherein the inertial element includes a pattern of predetermined configuration comprised of radioactive and non-radioactive areas formed by interstitially retained atoms of an inert gas radioisotops.

Another object of the present invention is the provision of a gyroscope including an inertial element supported for rotation about a spin axis and wherein the inertial element includes a pattern in predetermined configuration comprised of radioactive and non-radioactive areas formed by atoms of krypton–85 interstitially retained within the material of the inertial element, and wherein radiation detectors are positioned to sense the pattern and provide an output signal to a utilization circuit, the output signal of the utilization circuit being digital.

Another object of the present invention is the provision of an inertial instrument of the type described wherein the inertial element includes a passive source in the form of a pattern of radioactive and non-radioactive areas, the surface of the inertial element being substantially continuous and free of seams and joints in the junction between the two areas, and wherein detectors are mounted to sense the pattern and cooperate with a utilization circuit to provide an output signal which is digital.

BRIEF DESCRIPTION OF THE DRAWINGS

FIG. 1 is a schematic view of an inertial instrument and a utilization circuit in accordance with the present invention;

FIG. 2 is a graph showing the average value of the electrical signal as a function of angular displacement of the inertial element of the instrument shown in FIG. 1;

FIG. 3 is a schematic view of another form of inertial instrument in accordance with the present invention; and FIG. 4 is a schematic view of a utilization circuit used with the inertial instrument of the present invention.

DESCRIPTION OF THE PREFERRED EMBODIMENTS

Referring to FIG. 1 which illustrates the features of the present invention, an inertial element 10 is supported within an envelope 12, the envelope 12 being supported for rotation about an axis 14 on a gimbal 80, in a conventional manner. The gimbal is supported for rotation about axis 15 which is in 90° phased relation to axis 14 and is mounted on a support element, not shown, in a conventional way as described, for example in U.S. Pat. No. 3,239,673.

The surface of the inertial element 10 is provided with a pattern in predetermined configuration, the pattern being comprised of one or more radioactive areas 20 with adjoining non-radioactive areas generally indicated at 21. The radioactive areas are formed by atoms of the inert gas radioisotope krypton–85 interstitially retained within the material constituting the inertial element. This radioisotope is a beta (670 kev.) and gamma (517 kev.) emitter and has a half-life of about 10.6 years. The surface of the inertial element 10 is free of seams and joints or raised sections because the atoms are interstitially retained as described in the aforementioned application filed concurrently herewith.

In the form shown in FIG. 1 the inertial element is a sphere 10 rotating in the direction indicated by the arrow with the spin axis of the sphere being axis 15. Mounted on the casing 12 is a detector 25 positioned to scan the equator of the sphere 10 when the spin axis of the sphere is in a normal position. In this relative position, the spin axis of the sphere is at a zero deflection angle relative to axis 15. The detector is sensitive to beta or gamma or both and may be any of the conventional detectors which are well known in the art.

The radioactive area 20 of the pattern shown in FIG. 1 extends from pole to pole of the sphere 10, with the longest dimension in the latitude direction being at the equator and decreasing as the latter approaches the poles. The radioactive area 21 is generally diamond-shaped with the sides 21a forming two legs of a triangle extending from the pole to the equator rather than being positioned along a longitudinal meridian line. The width of the pattern at a latitude half-way between the equator and the pole is half the width of the pattern at the equator, and at the 60° latitude line is a third of the width of the pattern at the equator. Thus, as the sphere is tilted off the zero degree or normal spin axis 15 through an angle theta, as indicated by the arrow, the period of time the detector scans the radioactive areas becomes less and less in a linear fashion. Accordingly, with this pattern, the output of the detector 25 is fed to an averaging circuit 27 the output of which is fed to a meter 29 which reads in degrees. The output of the detector is a train of pulses having a repetition rate proportional to the rotor spin velocity and a pulse width which is a function of the orientation of the casing 12 with respect to the spin axis 15. The DC average value of the pulse train is related to the angle theta or rotor axis misalignment as illustrated in FIG. 2.

The detector 25 responds to radiation from the radioactive areas 20 of the pattern as the sphere or inertial element 10 spins. Since the angular velocity in radians per second is the same on all points in the surface of the sphere for a given number of revolutions per minute, and because of the shape of the pattern shown in FIG. 1, the output of the detector may be fed to the averaging circuit 27 to provide a read-out directly in degrees by meter 29. The average value of the signal is maximum in zero degree deflection and minimum as the deflection approaches 90° as shown in FIG. 2. With patterns of a configuration other than that shown in FIG. 1, other curves will be generated.

As shown in FIG. 1, additional code marks 30 may be placed on the lower half of the sphere 10 if it is desired to ascertain the direction of deflection in addition to the amount thereof. It is also understood that additional detectors may be used and positioned to sense movement in a second direction so as to provide positional information with respect to two degrees of freedom. Such a gyro would provide pitch and yaw or pitch and roll information.

In the embodiment shown in FIG. 1, the rotor may be internally supported by any well known conventional rotor support system such as air bearing, cryogenically supported or supported by electrostatic forces. In the case of a gyro having two degrees of freedom, information can be provided about two axes of rotational freedom, that is, the two axes would form an orthogonal triad with the rotor or spherical spin axis.

Referring to FIG. 3, another gyro system is shown schematically wherein a spherical inertial element is provided with a D-shaped pattern 36 and 37 at its poles. The D-patterns 36 and 37 are formed by atoms of an inert gas radioisotope krypton–85 interstitially retained within the material constituting the sphere. The sphere 35 also includes a pattern which extends from one pole to the other across the equator of the sphere, the pattern being comprised of strips 40, 41 and 42 also formed of interstitially retained atoms of the inert gas radioisotope krypton–85. Reference strip 42 represents the zero degree phase mark.

The spin axis 45 of the sphere and the D-patterns 36 and 37 are so related that the spin axis passes through the center of the surface formed by the semi-circular D-patterns which are 180° out of phase. An end axis sensor 46 is provided exactly on the spin axis and absent any displacement of the inert element 35 relative to the casing, the output of the end axis sensor 46 will be a non-varying DC signal. As the end axis sensor is displaced off the spin axis, the output of the end axis sensor 46 is a signal varying in time with a frequency equal to the spin frequency of the sphere 35. The magnitude of the signal is proportional to the amount of the displacement off the axis 45. For further details of the operation of the end axis sensor reference is made to U.S. Pat. 3,239,673 previously identified.

A second sensor 48 is positioned along the equator of the sphere and scans marks 40, 41 and 42 to provide reference information which, along with the output of the end axis sensor 46 may be used with the electrodes described in U.S. Pat. 3,239,673. The advantage of utilizing a pattern formed by interstitially retained atoms of krypton–85 is a construction such as is shown in FIG. 3, is that the nonsymmetrical pattern does not appreciably affect the balance of the rotor because the mass of the rotor with the pattern on it is not appreciably different from the mass of the rotor prior to the time the pattern was formed. Also, the pattern is free of joints or seams so that from all outward appearances, the surface of the sphere is continuous and unbroken.

An inertial instrument having a somewhat higher degree of accuracy is described in FIG. 4. This system measures the discrete radiation events that occur in the retained radioisotope source embodied in the rotor to provide a digital signal. The radiation pulses induced in the detector as the pattern passes adjacent thereto are individually processed by the electronic units described below. This mode of operation is possible since the radiation detector is capable of providing a pulse for each count of the detected radiation produced by the particular radioactive area being scanned. This is in contrast to an active source utilizing a photosensitive element which is unable to detect individually the photons which are received by the photosensitive element. The radiation detector, on the other hand, is capable of providing successive groups of pulses, the number of pulses in each group being proportional to latitude.

Referring now to FIG. 4, the reduction source pattern on the rotor irradiates the detector 25 mounted on the gyro case. This irradiation occurs only when the pattern is positioned adjacent to the detector, of course. The radiation detector 25 in this embodiment of the present invention must be of the fast response, pulse type detector such as provided by various semiconductor materials commercially available. Where space is not a problem, a scintillation crystal-photomultiplier may be employed. The pulses provided by the detector 25 are amplified by a preamplifier unit 50. A pulse shaper 51 is employed to shape the pulses amplified by the preamplifier 50. The output signal of the pulse shaper 51 may have the waveform indicated above line 52. The signal is observed to be a train or group of pulses having a periodicity, T, depending on the speed of the rotor. The pulse train provided by the radiation detector and pulse amplifying and shaper circuits is seen to include not only large pulses resulting from the detection of discrete distintegrations of the radiation source, but also pulses of somewhat smaller amplitude which may be due to background radiation and is commonly referred to as "noise." An amplitude threshold detector 53 may be employed to eliminate the noise pulses from the pulse train by passing pulses above a threshold. The noise-free pulse groups are applied to a one-shot multivibrator 54 which provides a rectangular pulse of fixed amplitude and duration for each pulse in the pulse group. This waveform is indicated at the output of one-shot multivibrator 54. The output pulse train provided by one-shot multivibrator 54 may be electronically processed to indicate rotor orientation such as deflection or latitude angle and spin speed.

To indicate deflection angle, the number of pulses occurring within the time interval T must be counted by a scaler 55. A digital readout unit 56 is responsive to the output of scaler 55 to indicate the deflection angle of the rotor. Scaler 55 counts the total number of pulses in a pulse train or group G. The total number counted will be indicative of the rotor deflection angle. Scaler 55 must respond to only one pulse group and not count pulses occurring in more than one pulse group. For this purpose, a reset unit 57 may be used to reset the scaler 55 whenever no pulses occur at the output of one-shot multivibrator 54. Other techniques may be employed to provide this reset function.

The number digitally indicated at 56 may be in units of angular measure such as radians. This direct readout may be achieved by selecting a radioactive pattern having a shape and activity of appropriate dimensions. Otherwise, the digital indication may be converted by means of a table to angular measure.

Rotor spin speed will be a function of how often the individual pulse trains or groups G appear at the output of one-shot multivibrator 54. For example, assuming there is only one pattern on the rotor, one pulse group will be generated for every revolution of the rotor. If multiple patterns are placed on the rotor, the pulse group frequency will be higher for each revolution of the rotor. To measure spin speed, a pulse integrator 58 may be employed to integrate the pulse groups G and provide an output signal 59 on line 60. For purposes of illustration, this waveform is shown in time coincidence with the pulse group waveform shown at the input of scaler 55. A digital scaler 62 counts the total number of integrated pulse groups G that occur in the waveform 59 over a fixed interval of time, for example, one second. Another digital indicator 64 may be coupled to the output of scaler 62 to indicate the rotor spin speed. The indication registered may be in units of revolutions per second, for example. The number of rotor patterns employed may be set in on line 66 to scale down the digital scaler 62 and compensate for the plural pattern effect.

In most cases the rotor spin speed will remain fairly constant. However, in those cases where it does not, the digital indication of spin speed may be utilized to change the scaling of the pulse train by unit 55. This is necessary because a total pulse count occurrng during time T will increase at slow rotor speeds, even though the latitude angle remains constant. This correction for spin speed will be apparent to those skilled in the art.

Alternatively, the digital output of one-shot multivibrator 54 may be converted to an analog signal indicative of deflection angle by means of a digital-to-analog converter 68. The analog signal provided by unit 68 may be indicated upon meter 70. This method deriving an analog signal is considerably more accurate than the averaging technique, described above in reference to FIG. 1.

While the invention has been described with reference to an inertial element which is a sphere, it is understood that the inertial element may be any of the inertial elements used in inertial instruments, for example, a rotating disk and the like. Patterns of different shape may be employed on the surface of the inertial element as is well known in the art. The advantage of the system in accordance with the present invention is that the surface of the inertial element is smoth and unbroken and is provided with a passive source thereby eliminating the possible errors introduced by use of active sources. Also, the detector is capable of providing a multiplicity of pulses each time a radioactive pattern is scanned rather than a single pulse as is the case with light source and photocell readouts. This feature provides a digital capability which is considerably more accurate than an analog system.

While the forms of apparatus herein described constitute preferred embodiments of the invention, it is to be understood that the invention is not limited to these precise forms of apparatus, and that changes may be made herein without departing from the scope of the invention.

What is claimed is:

1. An inertial instrument comprising a base, supporting means mounted on said base and including gimbal means rotatable relative to said base about a plurality of axes, an inertial member supported by said means for rotation about a spin axis and including a pattern in predetermined configuration defined by adjacent radioactive and non-radioactive areas, said radioactive area being constituted by an inert gas radiosotope interstitially retained in the lattice of the surface portion of said member constituting said radioactive area of siad pattern, and radiation detector means mounted on said support means for sensing said pattern and providing output signals in response thereto.

2. An instrument as set forth in claim 1 wherein said inert gas radioisotope is krypton–85.

3. An instrument as set forth in claim 1 further including utilization means receiving the output signals from said detector.

4. An instrument as set forth in claim 1 wherein said inertial element is a sphere whose equator is in the same plane as said detector when said spin axis is at a zero deflection angle relative to the normal pole position of said sphere relative to said gimbal, said pattern being so coordinated and correlated with respect to said detector as to produce an electrical signal representing the deflection angle, and means receiving said signal to indicate the deflection angle.

5. An instrument as set forth in claim 1 wherein said inertial element is a sphere whose surface is substantially continuous and free of seams and joints in the junction of said radioactive and non-radioactive areas.

6. An instrument as set forth in claim 5 wherein said radioactive areas emit beta and gamma radiation.

7. An instrument as set forth in claim 1 wherein said inertial element is a sphere having a D-shaped radioactive pattern on at least one pole thereof and radioactive pattern means extending between said poles and across the equator of said sphere, and said detector means including at least one detector element mounted to sense the pattern crossing said equator and an additional detector element mounted to sense said D pattern.

8. An instrument as set forth in claim 4 wherein the average value of the electrical signal decreases as said deflection angle increases.

9. An instrument as set forth in claim 5 wherein the radioactive surface of said sphere emits 670 kev. beta and 517 kev. gamma.

10. An instrument as set forth in claim 4 in which said radioisotope is retained in a diamond-shaped pattern extending between said poles and across the equator of said sphere.

11. An instrument as set forth in claim 1 wherein said inertial element is a sphere whose equator is in the same plane as said detector when said spin axis is at a zero deflection angle relative to the normal pole position of said sphere relative to said gimbal, said pattern being so coordinated and correlated with respect to said detector as to produce an electrical signal representing the spin speed of said sphere, and means receiving said signal to indicate said spin speed.

12. An instrument as set forth in claim 1, wherein said radiation detector means provides a train of signal pulses in response to said radioactive pattern area.

13. An instrument as set forth in claim 12 including means responsive to the number of signal pulses in said pulse train for indicating the deflection angle of said inertial member.

14. An instrument as set forth in claim 12 including means responsive to the number of discrete pulse trains occurring per unit time for providing a signal proportional to the spin speed of said inertial member.

References Cited

UNITED STATES PATENTS

| | | | |
|---|---|---|---|
| 3,239,673 | 3/1966 | Unruh | 250—203 |
| 3,270,567 | 9/1966 | Crampton | 74—5.6 |

FRED C. MATTERN, Jr., Primary Examiner

MANUEL A. ANTONAKAS, Assistant Examiner

U.S. Cl. X.R.

250—203